United States Patent [19]

Palmer et al.

[11] 4,369,946
[45] Jan. 25, 1983

[54] CABLE CLIPS

[75] Inventors: John P. Palmer, Reading; Patrick J. McCann, Crowthorne, both of England

[73] Assignee: ITW Limited, Windsor, England

[21] Appl. No.: 168,900

[22] Filed: Jul. 14, 1980

[30] Foreign Application Priority Data

Jul. 14, 1979 [GB] United Kingdom ................ 7924595

[51] Int. Cl.³ .............................................. F16L 3/08
[52] U.S. Cl. ..................................... 248/74 A; 24/257
[58] Field of Search ............. 248/74 A, 68 R, 74 PB, 248/316 D; 24/257, 254 R

[56] References Cited

U.S. PATENT DOCUMENTS

| 2,712,916 | 7/1955 | Franz | 248/68 R |
| 2,746,112 | 5/1956 | Simon | 24/259 R X |
| 3,245,031 | 4/1966 | Barney et al. | 24/257 X |
| 3,267,546 | 8/1966 | Kraft | 24/259 R |
| 3,485,468 | 12/1969 | Schweitzer | 24/257 X |
| 3,529,795 | 9/1970 | Van Niel | 248/74 PB X |
| 3,581,428 | 6/1971 | Helder | 24/257 |
| 3,599,915 | 8/1971 | Soltysik | 248/74 A X |
| 4,061,299 | 12/1977 | Karosaki | 248/74 PB X |
| 4,083,523 | 4/1978 | Fisher | 248/74 A |
| 4,195,807 | 4/1980 | Llauge | 248/74 A |

FOREIGN PATENT DOCUMENTS

| 2623040 | 11/1977 | Fed. Rep. of Germany | 248/316 D |
| 2725350 | 7/1978 | Fed. Rep. of Germany | 24/255 BS |
| 2819923 | 11/1978 | Fed. Rep. of Germany | 248/74 A |

Primary Examiner—Thomas J. Holko
Attorney, Agent, or Firm—Jerold M. Forsberg; Thomas W. Buckman; Jack R. Halvorsen

[57] ABSTRACT

Several cable clips are disclosed, all capable of use with an extensive range of numbers and/or sizes of cable, by virtue of providing a resilient arm of particular shape and stiffness, in conjunction with a finger which extends from one end of the arm, the other end of the finger being either free, or joined with the arm, or capable of latching engagement with either the arm or a base of the cable clip.

5 Claims, 13 Drawing Figures

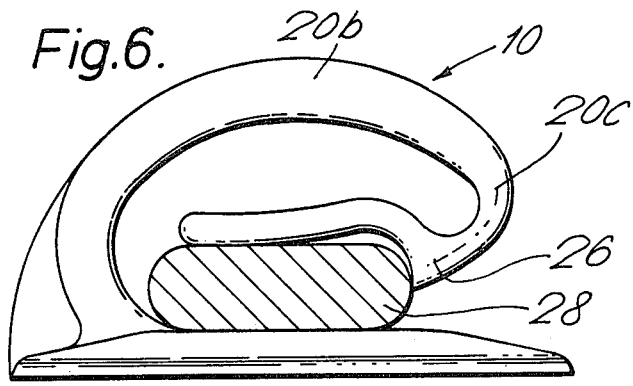
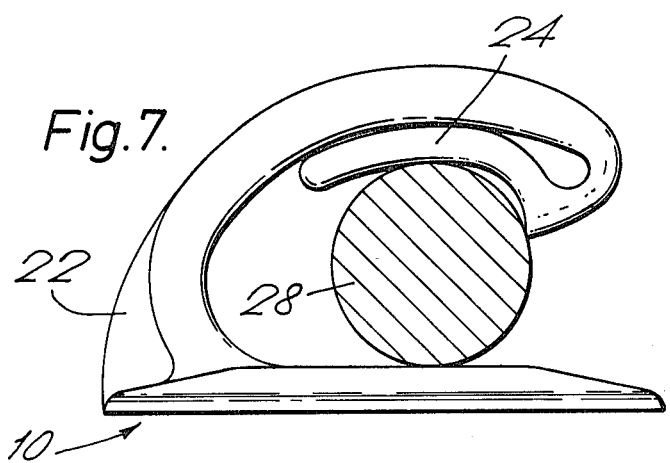
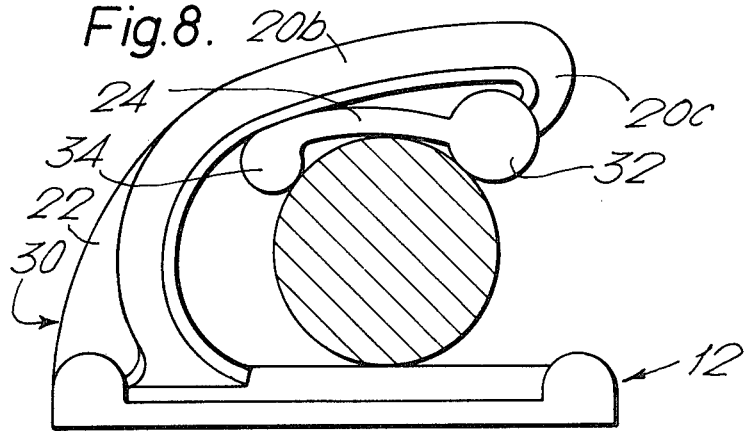

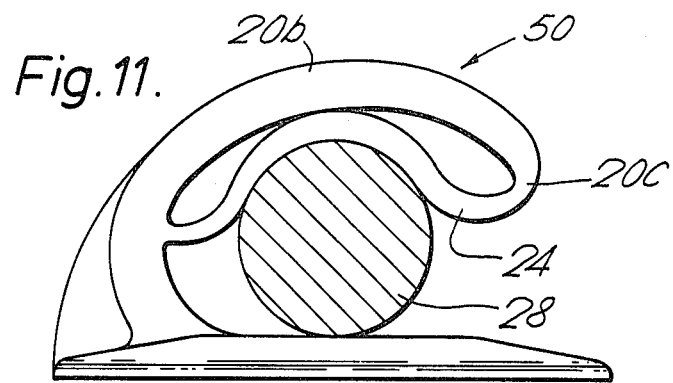
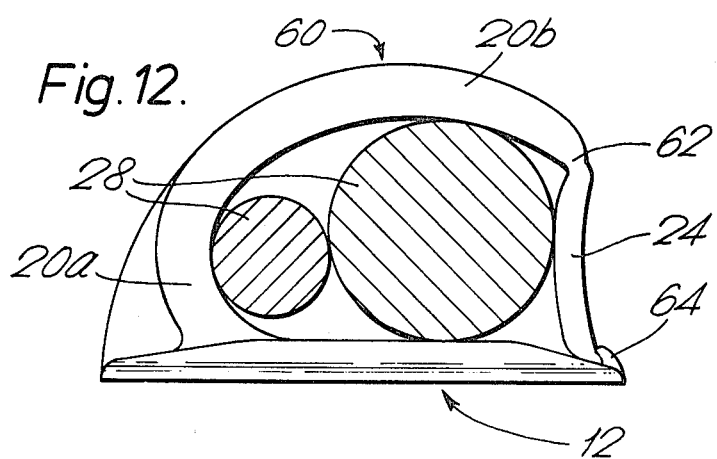
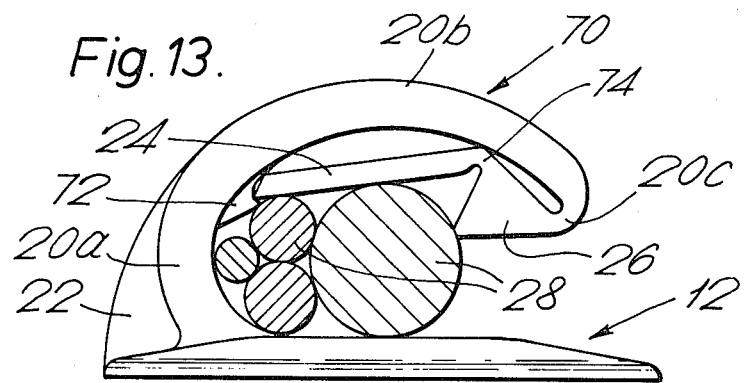

CABLE CLIPS

The present invention relates to clips for supportively attaching cables to a flat support such as a panel.

Known clips for this purpose have suffered from the disadvantage that they are unable to accommodate, and retain effectively, an extensive range of numbers and/or sizes of cable.

It should be noted that the term cable is also intended to cover similar items such as wires, cords, straps and ribbon cables.

According to the present invention, a cable clip comprises a planar base, a resilient arm having at one end of the arm a first portion which extends away from the base, a second portion of the arm curving to extend through a direction parallel to the base, and finally at the other end of the arm a third portion, which lies between the second portion of the arm and the base, is less stiff in bending about an axis parallel to the base and transverse to the arm than the first and second portions of the arm, and has a finger extending away therefrom for use in at least helping to retain on the base a cable inserted into the clip.

Preferably, the stiffness of the arm progressively decreases along the first and second portions of the arm towards the third portion of the arm.

The changes in stiffness may be achieved by shaping the arm so that its cross-section varies along its length, or the material of the arm may be caused to have varying properties, or both.

For example, if the cable clip is moulded in one-piece of a plastics material, the structure of the moulded material may be arranged so that there is a gradual or sudden transition in the material from a crystalline to an amorphous phase. Alternatively, the arm can be so configured that its cross-section changes to provide the variations in stiffness by the formation of voids within or apertures through or in the arm. Preferably, however, the first, second and third portions of the arm are blended together by smoothly curving contours, abrupt changes in cross-section of the arm thus being avoided.

The finger may be either of constant or varying cross-section, but preferably the stiffness of the finger progressively decreases along at least a major portion of the length of the finger towards that end of the finger remote from the third portion of the arm, with at least a major portion of the length of the finger being less stiff than any portion of the arm.

In the unstressed state, the finger may be straight or curved, and it may extend in a direction parallel to the base or it may be inclined thereto, and it may be split along its length.

That end of the finger adjacent to the third portion of the arm may be formed as a tooth and, if so, the remainder of the finger may be joined to the tooth by a weakened portion of the finger.

Although the above-mentioned preferred features are not mutually exclusive, the following three cable clips do embody different arrangements for the finger:

In a first arrangement, the first portion of the arm is formed with a catch with which that end of the finger remote from the third portion of the arm can latch;

In a second arrangement, the base is formed with a catch with which that end of the finger remote from the third portion of the arm can latch; and In a third arrangement, that end of the finger remote from the third portion of the arm is joined with the first portion of the arm.

These three cable clips, as well as other cable clips according to the present invention, will now be described, by way of example only, with reference to the accompanying drawings, in which:

FIGS. 6 and 7 show the cable clip accommodating respectively a ribbon cable and a wire;

FIG. 8 is a side view of a second cable clip shown accommodating a cable;

FIGS. 10 and 11 are side views of a fourth cable clip shown accommodating wires of different size; and FIGS. 12 and 13 are side views of fifth and sixth cable clips, respectively, showing different numbers and sizes of cable accommodated therein.

The reader should note that, for convenience, those parts of the various cable clips having the same function will be given the same reference numeral, even though those parts might differ from one another in appearance.

Figure 1:
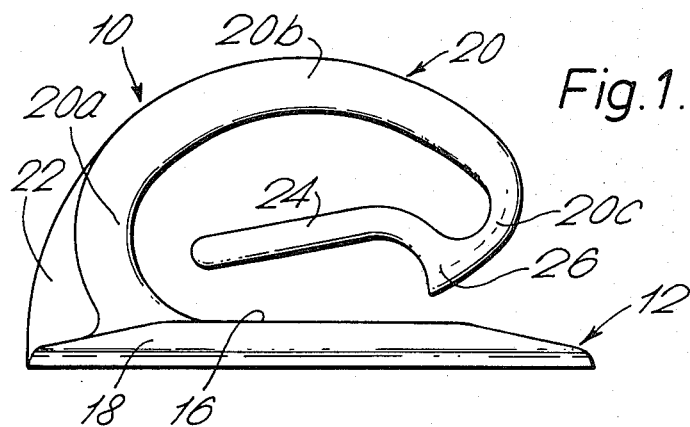
FIG. 1 is a side view of a cable clip according to the present invention.
Figure 2:
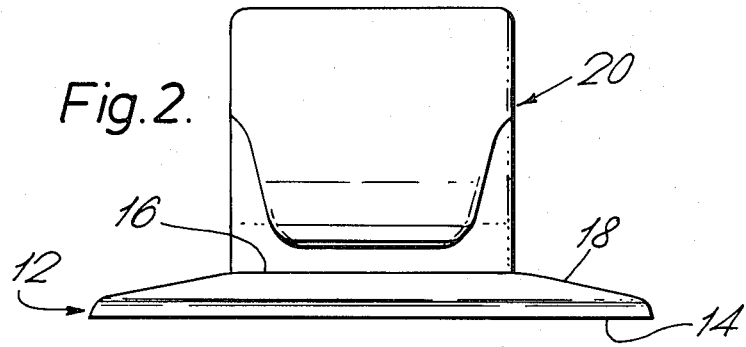
FIG. 2 is an end view of the cable clip looking from the right-hand end of FIG. 1.
Figure 3:
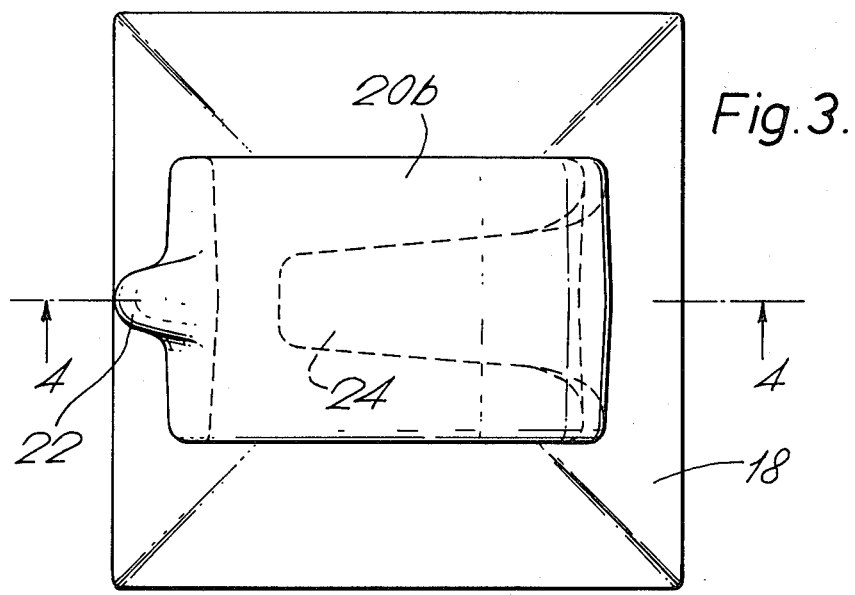
FIG. 3 is a plan view of the cable clip.

Referring initially to FIGS. 1 to 4, a cable clip 10 according to the present invention is shown including a planar base 12. One side of the base 12 is formed as a faying surface 14. The other side of the base 12 is formed with a central flat surface 16 bounded by sloping edge surfaces 18.

The cable clip 10 further includes a resilient arm 20, which comprises a first portion 20a at one end of the arm, an intermediate second portion 20b, and a third portion 20c at the other end of the arm.

The first portion 20a of the arm extends away from the base 12 and is reinforced by a central web 22. The second portion 20b of the arm curves to extend through a direction parallel to the flat surface 16. The third portion 20c of the arm lies between the second portion 20b of the arm and the base 12.

A finger 24 extends away from said other end of the arm. That end of the finger 24 adjacent to the third portion 20c of the arm is formed as a tooth 26. The other end of the finger 24 points generally towards the first portion 20a of the arm.

The stiffness of the arm 20 progressively decreases along its length.

Figure 4:
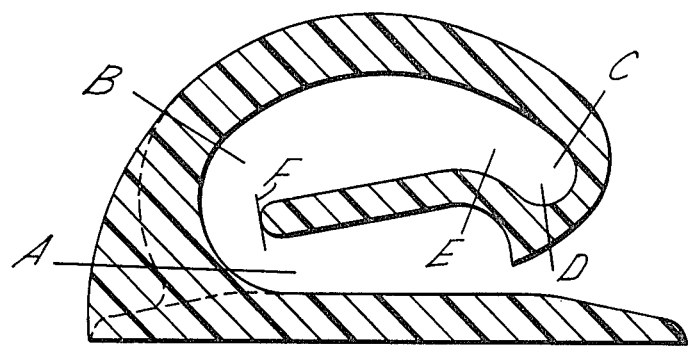
FIG. 4 is a cross-section taken along the line 4—4 of FIG. 3.

In particular, the stiffness of the first portion 20a of the arm, extending between sections A and B shown in FIG. 4, progressively decreases as the effect of the reinforcing web 22 diminishes. The stiffness of the second portion 20b of the arm, extending between sections B and C shown in FIG. 4, progressively decreases as its thickness is reduced, its width remaining unchanged. Finally, the stiffness of the third portion 20c of the arm, extending between sections C and D shown in FIG. 4, also progressively decreases, but much more rapidly, as both its thickness and its width are reduced.

The third portion 20c of the arm is thus less stiff in bending about an axis parallel to the base 12 and transverse to the arm 20 than the first and second portions 20a and 20b of the arm.

Closer control over the stiffness of the arm is achieved by reducing the width rather than the thickness, because of the relationship between these dimensions and the stiffness of the arm. In the present cable clip, the arm has a cross-section sufficiently similar to a rectangle for the assumption that it is a rectangle to introduce no significant errors into stress calculation. Thus, it can be assumed that the stiffness of the arm is proportional to the width of the arm and to the cube of the thickness of the arm, at least where the stiffness of the arm is not further influenced by the reinforcing web. With this relationship, any desired variations in stiffness along the length of the arm can be simply achieved by applying the same variations to the width of the arm.

It will be appreciated that the same considerations also apply to the stiffness of the finger. Thus, although the tooth 26, extending between sections D and E shown in FIG. 4, leads to an abrupt increase in stiffness, the remainder of the length of the finger 24, extending between sections E and F shown in FIG. 4, again progressively decreases in stiffness. The major portion of the length of the finger 24 can indeed be less stiff than any portion of the arm 20.

Figure 5:
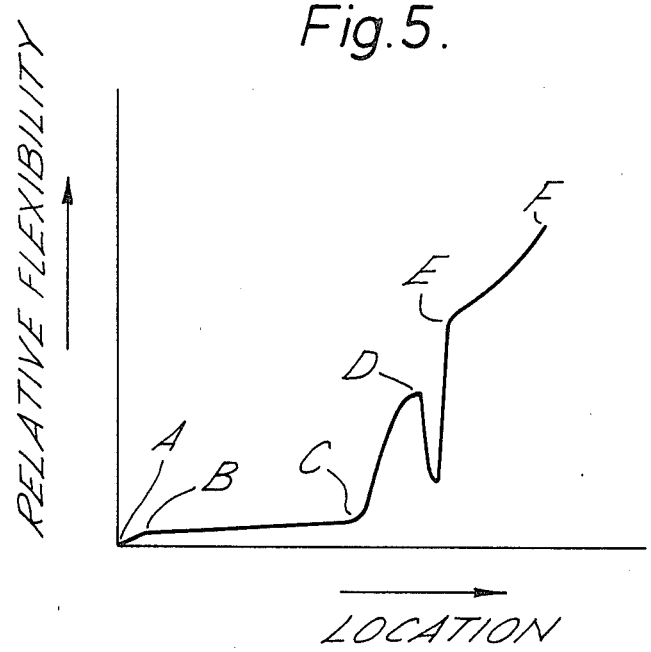
FIG. 5 is a schematic representation in graph form of the changes in stiffness between the sections indicated in FIG. 4.

The above-described variations in stiffness are illustrated particularly clearly by the schematic graph of FIG. 5—which contrasts relative flexibility (inversely proportional to stiffness) against location.

In use, the cable clip 10 is first attached to a panel or other flat surface by means of double-sided adhesive tape on the faying surface 14, but any other convenient attaching means could be utilized, for example a snap-fixing member could project from the faying surface 14 to snap engage in an aperture in the panel or other flat surface.

In order to retain a cable, the cable is inserted beneath the arm 20, from the right as seen in FIG. 1, so that the adjacent sloping edge surface 18 acts as a lead-in or camming surface to enlarge the gap between the tooth 26 and the base 12.

When the cable has passed through the gap, it is engaged by the finger 24, which is resiliently deflected by the presence of the cable so that at least part of the length of the finger 24 exerts a downwards clamping pressure on the cable, the tooth 26 of the finger 24 resisting withdrawal of the cable.

FIGS. 6 and 7 show the differences in configuration of the cable clip 10 when cables 28 of different sizes are held therein —FIG. 6 showing the cable 28 in the form of a ribbon cable, with FIG. 7 showing the cable 28 in the form of a wire.

That face of the finger 24 facing towards the flat surface 16 of the base 12 may be formed with serrations or transverse ridges to enhance its ability to retain the cable 28 therein.

As is clear from FIG. 6, when a cable of small thickness is held, the thickness being measured in a direction perpendicular to the flat surface 16, the finger 24 is deflected but the arm 20 is relatively undisturbed because of its greater stiffness. The third portion 20c of the arm is in fact only slightly deflected, the moment exerted through the finger 24 being insufficient to overcome the stiffness at the third portion 20c of the arm by any significant amount.

When a cable of greater thickness is inserted into the cable clip 10, such as the wire shown in FIG. 7, greater deflection of the finger 24 is of course necessary. This leads to larger moments at the third portion 20c of the arm, which consequently deflects. There is still, however, no significant deflection of the second portion 20b of the arm.

If a cable of even greater thickness is inserted into the cable clip 10, the second portion 20b of the arm will be deflected. This is illustrated in FIG. 8, which in fact shows another cable clip 30 according to the present invention, the cable clip 30 being similar in many respects to the above-described cable clip 10. Instead of the finger 24 of the cable clip 30 being formed at one end as a tooth, said end is formed as a cylindrical enlargement 32, with the other end of the finger 24 being formed as another cylindrical enlargement 34. When the cable clip 30 accommodates the largest possible size of cable, both of the enlargements 32 and 34 may contact and resiliently deflect the second portion 20b of the arm, depending on the flexibility of the third portion. The third portion 20c of the arm is resiliently deformed into a tight curve.

The remaining FIGS. 9 to 13 illustrate further alternative cable clips according to the present invention.

Figure 9:
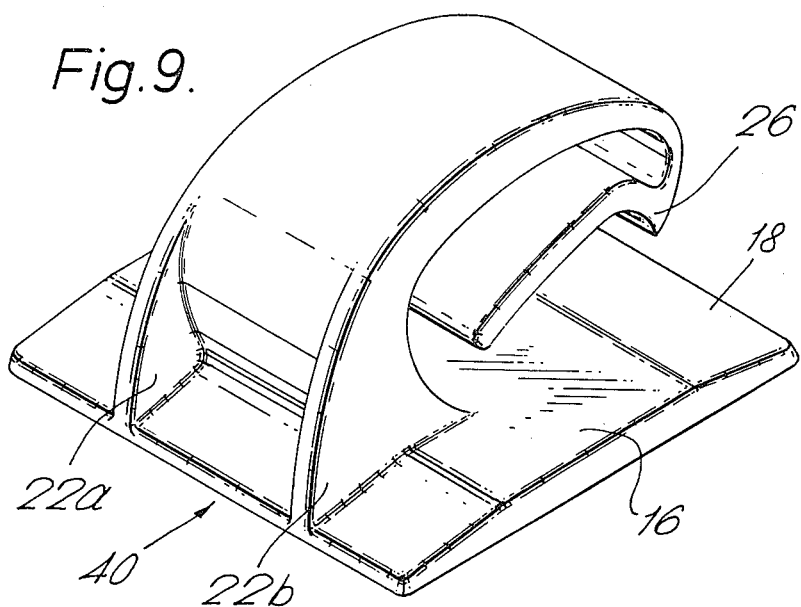
FIG. 9 is a perspective view of a third cable clip.

FIG. 9 shows a cable clip 40 which is closely based on the cable clip 10, but instead of including merely a central reinforcing web 22, the cable clip 40 includes a pair of spaced reinforcing webs 22a and 22b.

Figure 10:
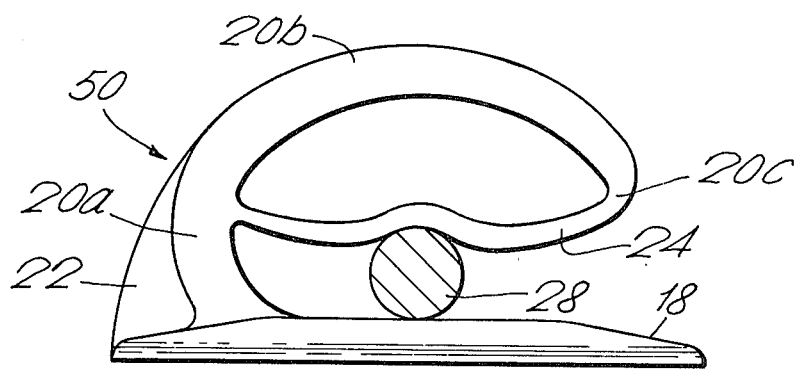

FIGS. 10 and 11 show a cable clip 50 accommodating different thicknesses of cable 28 corresponding to the thicknesses shown in FIGS. 6 and 7. In the cable clip 50, that end of the finger 24 remote from the third portion 20c of the arm is joined with the first portion 20a of the arm. In FIG. 10, the cable 28 is retained primarily by resilient deflection of the finger 24; in FIG. 11, the cable 28 is retained by a resilient deformation of both the finger 24 and the third portion 20c of the arm. If a cable of even greater thickness was inserted into the cable clip 50, there would then also be a resilient deflection of the second portion 20b of the arm.

FIG. 12 shows a cable clip 60 which differs from the cable clip 10 in two main respects. In the cable clip 60, the third portion 20c of the arm extends for only a short distance along the length of the arm and can be regarded as a hinge 62. The other difference is that the base 12 is formed with a catch 64 with which that end of the finger 24 remote from the hinge 62 can latch. Clearly, the fact that the finger 24 can latch with the base 12 strongly resists inadvertent withdrawal of the cables 28, which can however be removed when desired merely by releasing the free end of the finger 24 from the catch 64.

Finally, FIG. 13 shows a cable clip 70 which again differs from the cable clip 10 in two main respects. In the cable clip 70, the first portion 20a of the arm is formed with a catch 72 with which that end of the finger 24 remote from the third portion 20c of the arm can latch. The other difference is that the tooth 26 is joined to the remainder of the finger 24 by a weakened portion which acts as a hinge 74. The "double-hinging" formed by the hinge 74 in conjunction with the third portion 20c of the arm can be particularly useful in resisting inadvertent withdrawal of cables 28.

Although not illustrated, it is possible that any of the fingers might be split along its length.

Each of the cable clips according to the present invention illustrated herein, and described hereinbefore, is preferably formed in one-piece of a plastics material, and more specifically is preferably integrally moulded in nylon 6.6.

We claim:

1. A one-piece plastic cable clip comprising a planar base, a resilient arm and a resilient finger, said arm having a first portion extending generally away from the base, a second portion curving and extending in a direction substantially parallel to the base, and a third portion extending from the second portion generally towards the base, said first and second portions being more resistant to bending then said third portion about an axis parallel to the base and transverse to the arm, said arm progressively becoming less resistant to bending along the first and second portions towards said third portion, said resilient finger extending away from said third portion and between said second portion and said base, said third portion being adapted to permit said finger to engage said second portion and cooperate therewith when the clip is used to position a larger size of cable, a portion of the finger proximate to the third portion including a tooth protruding generally towards said base, said tooth being substantially thicker than the third portion and the finger and being substantially inflexible, said finger including a portion which is less resistant to bending than said first and second portions wherein said tooth is disposed between the less resistant to bending finger and third portion, said base including a sloping edge surface forming a lead-in, said sloping edge of said planar base cooperating with the resiliency of said arm and said finger to facilitate insertion of a cable into the clip whereby a cable is securely retained in the clip by the cooperation of the resilient finger and arm, the substantially rigid tooth, and the base.

2. A cable clip according to claim 1, in which at least a major portion of the length of the finger is less resistant to bending than any portion of the arm.

3. A cable clip according to claim 2, in which said major portion of the finger is joined to the tooth by a weakened portion which is substantially less resistant to bending then the major portion of the finger.

4. A cable clip according to claim 1, in which the first portion of the arm is formed with a catch with which that end of the finger remote from the third portion of the arm can latch.

5. A cable clip according to claim 1, in which at least one reinforcing web extends between the base and the first portion of the arm.

* * * * *